No. 767,775. PATENTED AUG. 16, 1904.
F. SUTTON.
BROOM CORN HARVESTER.
APPLICATION FILED APR. 18, 1902.
NO MODEL. 8 SHEETS—SHEET 1.

Witnesses
Elmer Leavey
Geo. A. Hanlin

Inventor
Frank Sutton,
By William L. Ford,
Attorney

No. 767,775. PATENTED AUG. 16, 1904.
F. SUTTON.
BROOM CORN HARVESTER.
APPLICATION FILED APR. 18, 1902.
NO MODEL. 8 SHEETS—SHEET 2.

Witnesses
Elmer Leavey
Geo. A. Hamlin

Inventor
Frank Sutton,
By William L. Ford
Attorney

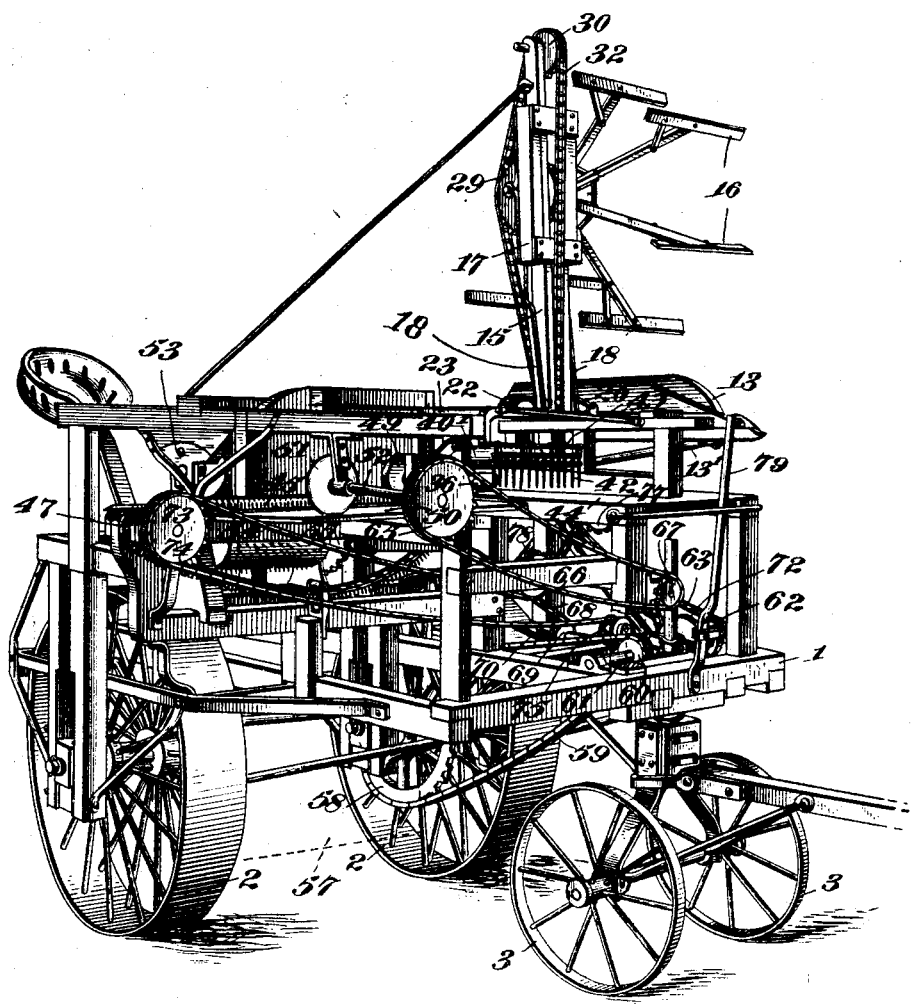

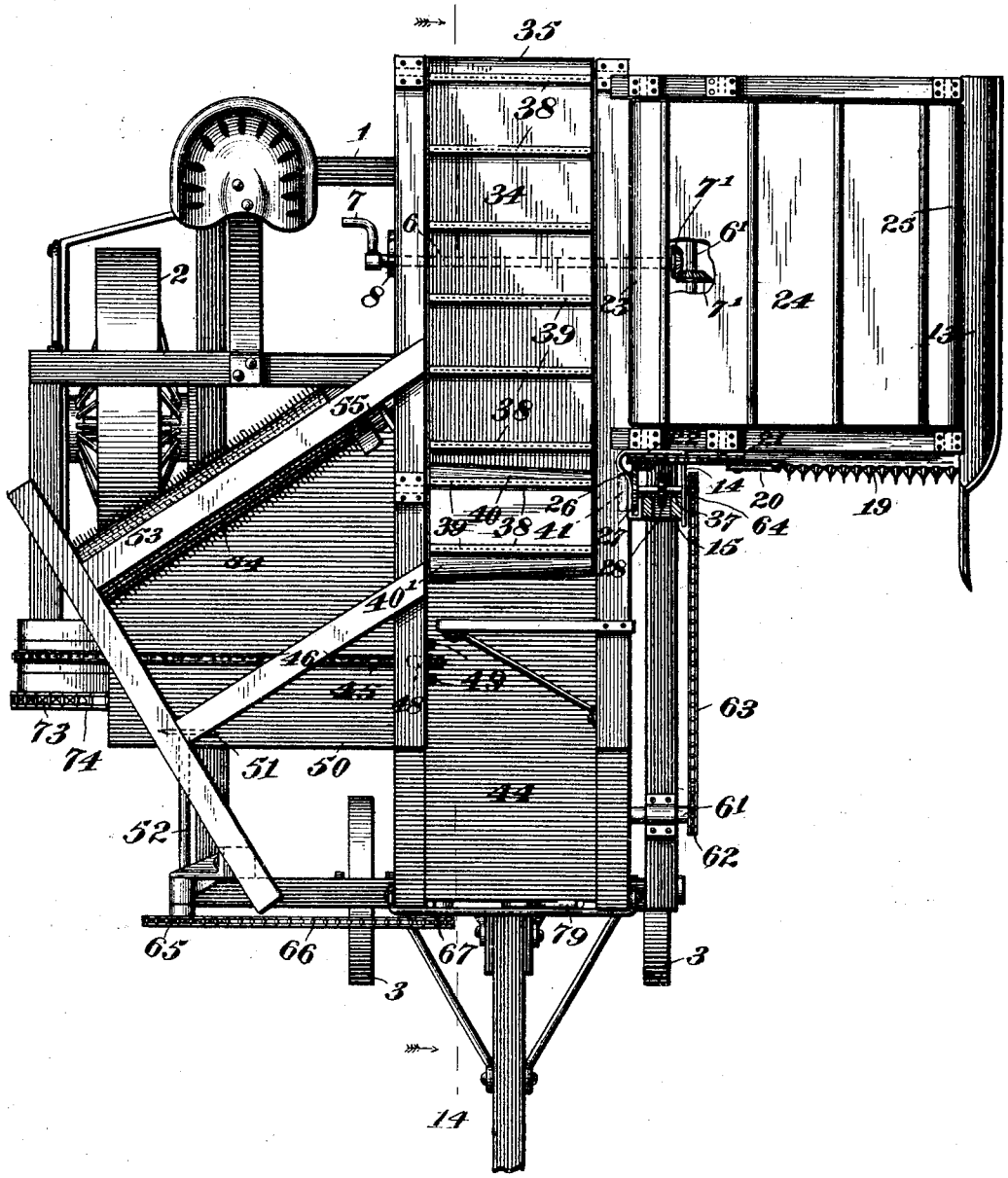

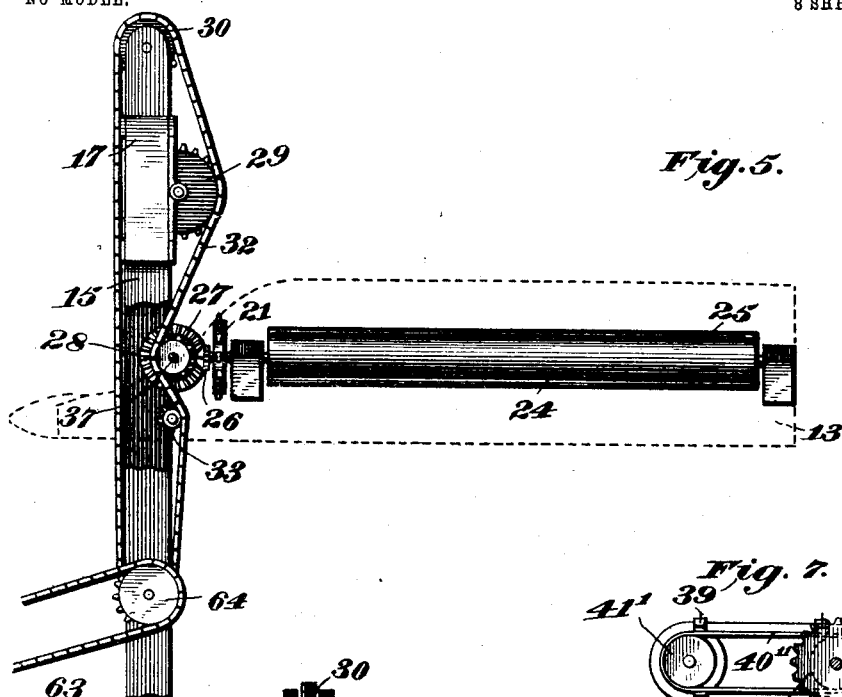
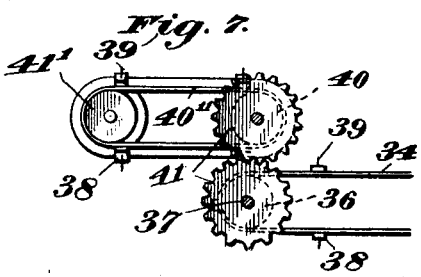
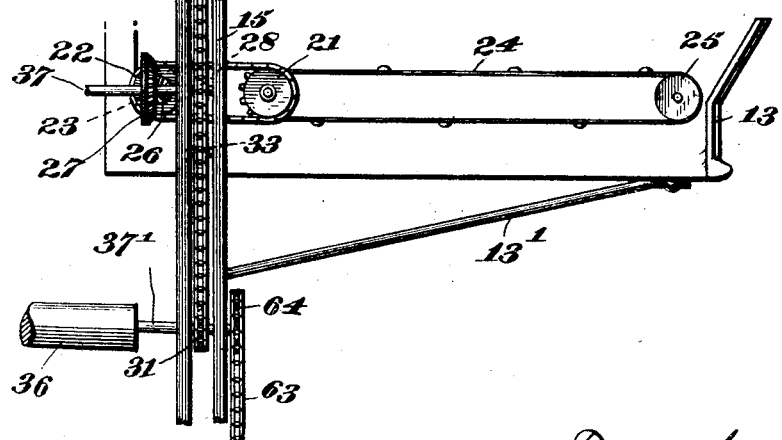

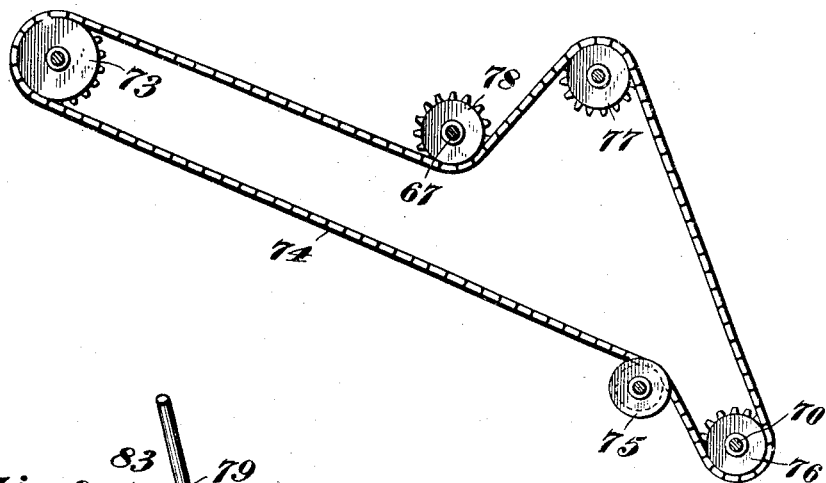
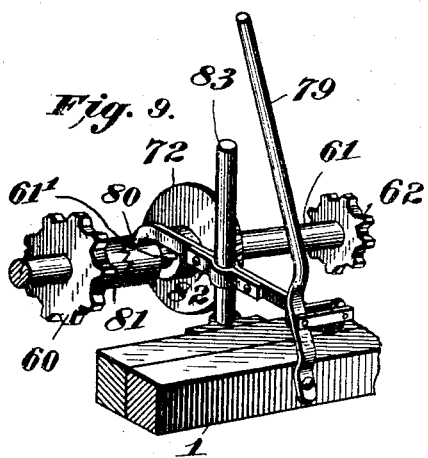
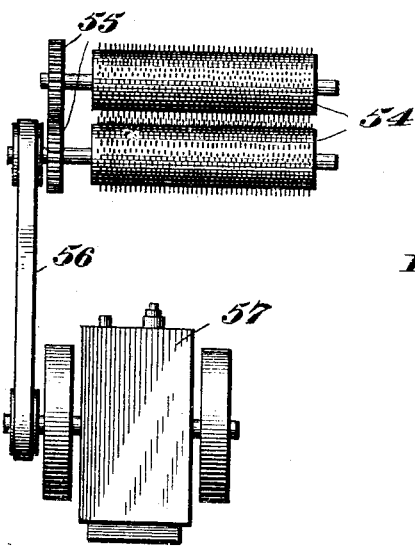
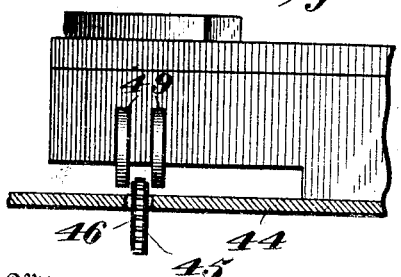

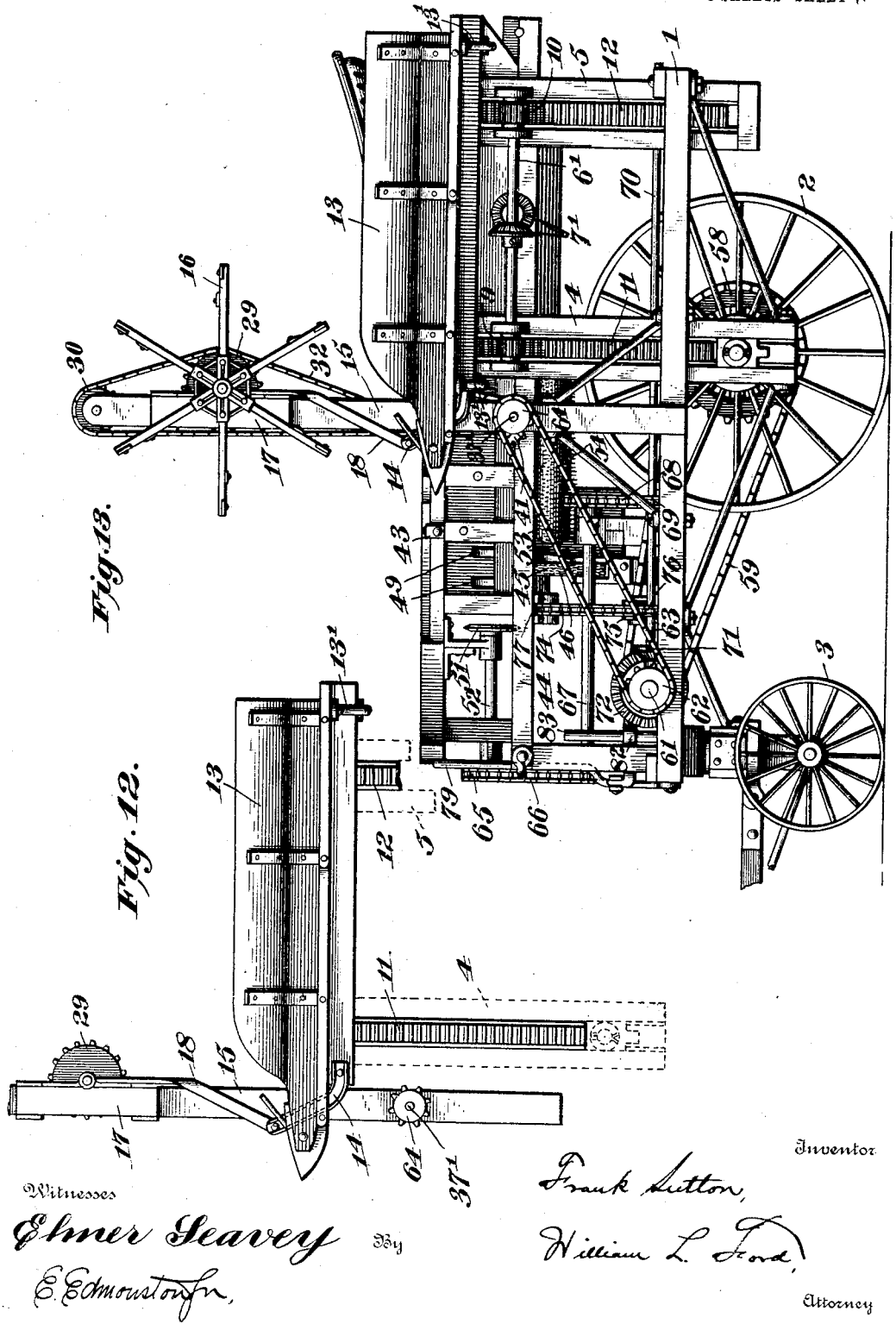

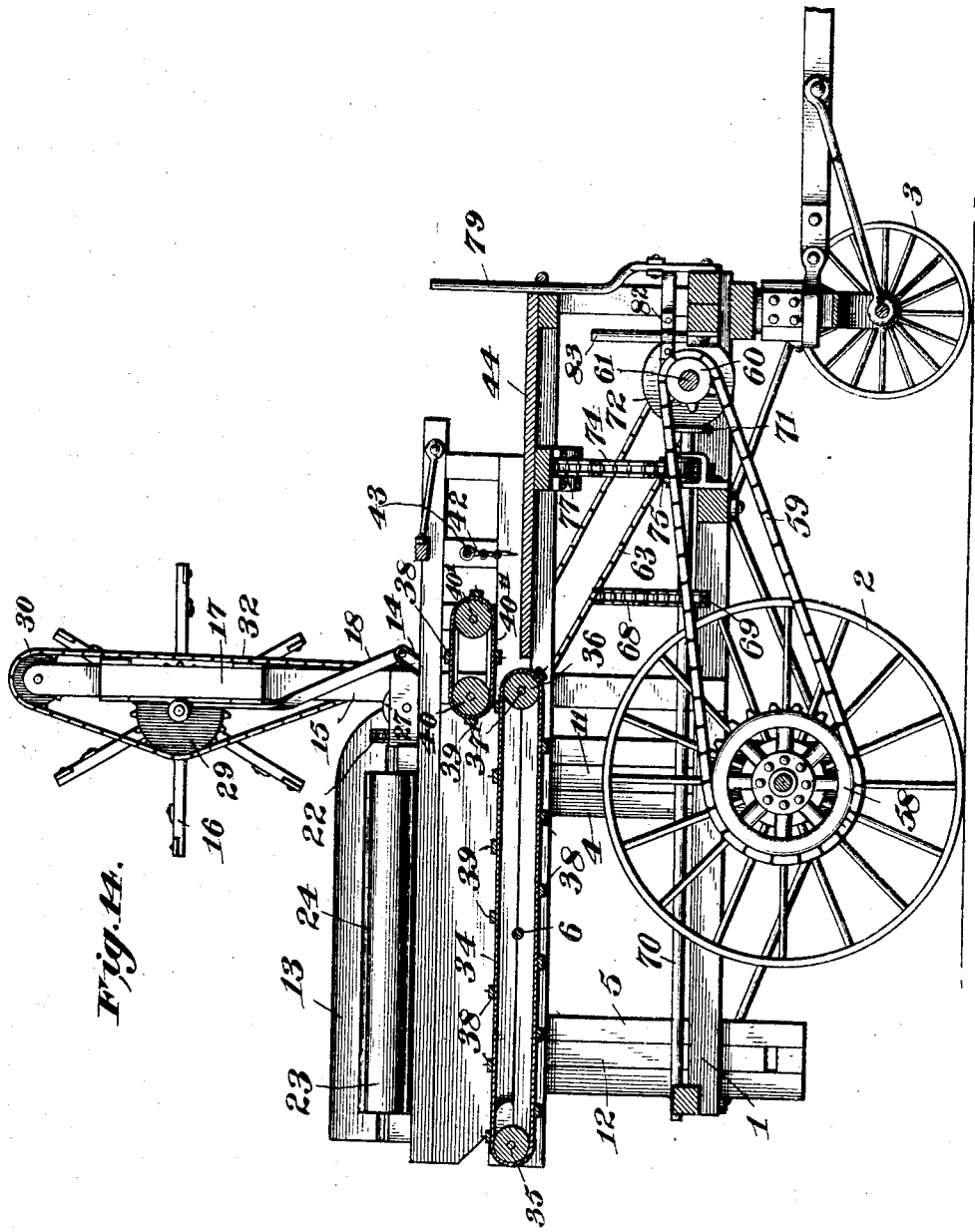

No. 767,775.

Patented August 16, 1904.

UNITED STATES PATENT OFFICE.

FRANK SUTTON, OF MATTOON, ILLINOIS.

BROOM-CORN HARVESTER.

SPECIFICATION forming part of Letters Patent No. 767,775, dated August 16, 1904.

Application filed April 18, 1902. Serial No. 103,574. (No model.)

*To all whom it may concern:*

Be it known that I, FRANK SUTTON, a citizen of the United States, residing at Mattoon, in the county of Coles and State of Illinois, have invented certain new and useful Improvements in Broom-Corn Harvesters, of which the following is a specification.

My invention relates to broom-corn harvesters.

One object of the present invention is the provision, in a broom-corn harvester, of improved and novel means for raising and lowering the sickle and apron, so that the corn can be cut according to the height of the corn as standing and without interfering with the operation of the machine.

Another object of the invention is the provision of certain improvements for driving the reel and the sickle and aprons employed for conveying and evening the corn after it has been harvested.

A still further object is to provide a novel and peculiar construction and arrangement of parts to gage or stop the corn and even it up into corresponding lengths prior to cutting of the stalks and threshing of the corn.

Another object of the invention is the provision of novel mechanism for conveying the stalks to the threshing means and for cutting the stalks the proper length while in transit.

Having the foregoing and other not specifically mentioned objects in view, the present invention comprises a broom-corn harvester embracing certain novel mechanisms coördinating and acting in an improved manner, as fully set forth in the following specification and appended claims.

Figure 1:
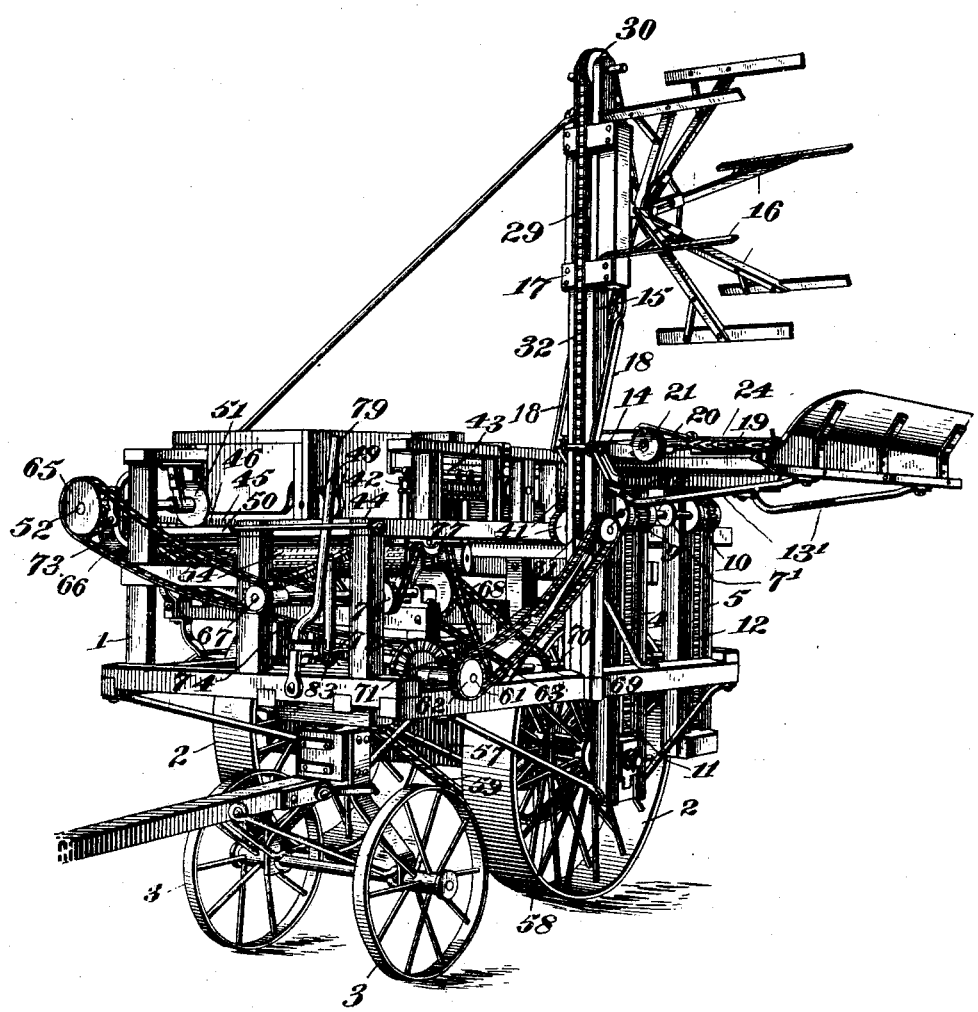
Figure 2:
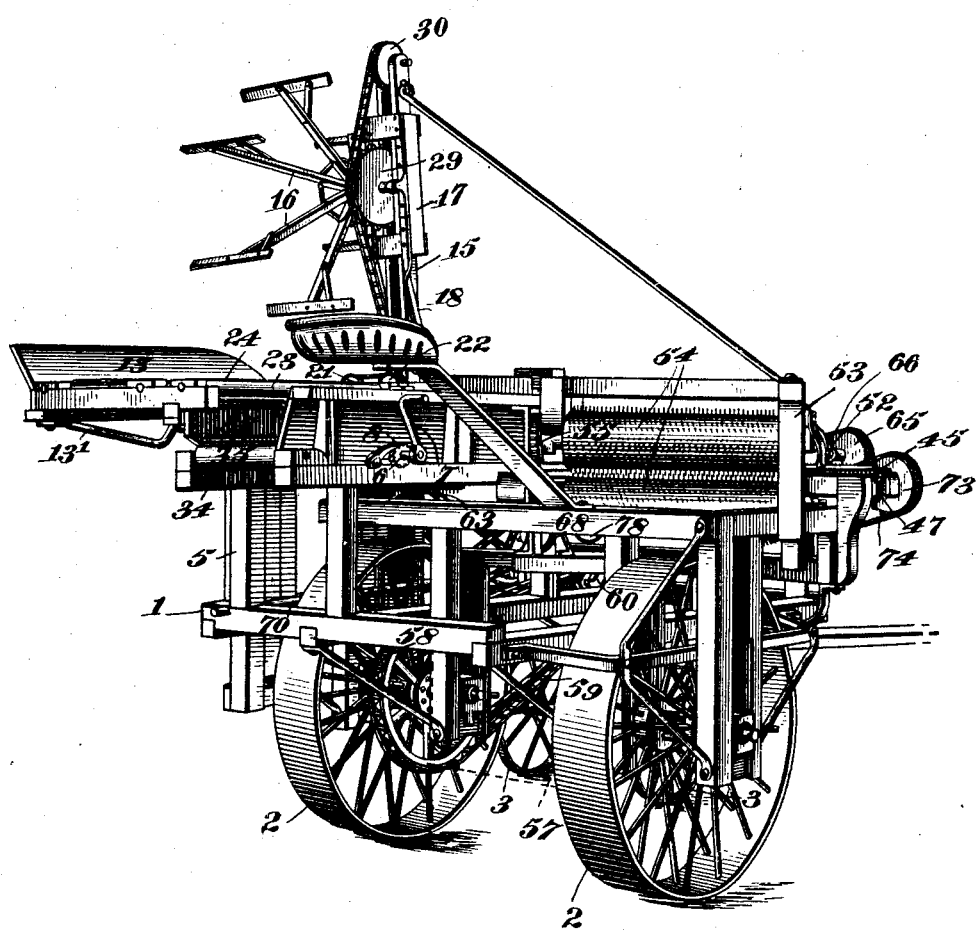

In the accompanying drawings, Figures 1, 2, and 3 are perspective views of the complete machine; Fig. 4, a top plan view omitting the reel and its mechanism; Figs. 5 and 6, enlarged detail views of the gearing for operating the conveyer-apron, the sickle, and the reel; Fig. 7, a detail showing the end of the evener-apron and the auxiliary evener feed-apron working therewith; Fig. 8, a detail showing the arrangement of the sprocket-chain which operates the feed-chain; Fig. 9, a detail of the clutch mechanism for throwing the sickle in and out of gear; Fig. 10, a detail showing the manner of driving the threshing-rollers, and Fig. 11 a detail of the feed-chain and pressing-wheels. Fig. 12 is a detail view showing the reel-post, the reel-slides, and associated parts; Fig. 13, a side elevation looking toward the right-hand side of Fig. 1, and Fig. 14 a longitudinal section taken on line 14 14 of Fig. 4.

The framework 1 of the machine may be of suitable construction to accommodate the various mechanisms which are employed, and it is supported mainly by the broad traction-wheels 2. The front portion of the machine is supported by the small wheels 3, which are offset laterally in relation to the wheels 2. At one side of the machine are parallel guides 4 and 5, disposed in a vertical direction, while 6 is a shaft provided with a crank 7 and ratchet mechanism 8, located adjacent the driver's seat, which is suitably journaled and which is geared to a shaft 6' by bevel-pinions 7', the said shaft 6' having thereon the pinions 9 and 10.

The numerals 11 and 12 designate racks which are adapted to travel up and down in the guides 4 and 5 and which mesh with the pinions 9 and 10. The sickle mechanism and apron for conveying the corn after cutting by the sickle are supported by the racks 11 and 12.

The frame which carries the sickle mechanism and apron is shown at 13 and is suitably braced by the bars 13', while it is guided in its up and down movements and further braced by the slide 14, which is adapted to move up and down on the reel-post 15 on the frame 1. The reel 16 for drawing in the corn to the sickle is carried by a traveler 17, which is connected to and movable with the slide 14 by the rods 18, in consequence of which the reel will always remain in the same position in relation to the sickle and at the same distance therefrom regardless of the height to which the frame 13 may be raised or lowered, and it will be understood that the raising and lowering of the frame 13 is accomplished by turning the crank 7, which through the pinions and racks will push up the frame 13 or lower it, the pawl-and-ratchet mechanism 8 holding it wherever adjusted.

The sickle 19 is of the usual construction and is reciprocated by a pitman 20 on a sprocket 21, which is connected by a chain to a sprocket 22. The sprocket 22 is on the inner roller 23, over which the carrying-apron 24 moves, another roller, 25, being employed at the outer portion of the frame 13 for the apron 24 to travel over. On the same shaft with the sprocket 22 is a bevel-pinion 26, which meshes with a bevel-gear 27 on the same shaft 37 with a sprocket-wheel 28. A large sprocket-wheel 29 is carried with the traveler 17, which supports the reel, while at the top of the reel-post 15 is a sprocket 30, and in the lower portion of the reel-post is a sprocket 31.

The numeral 32 designates a sprocket-chain which travels over the sprocket 30, sprocket 29, sprocket 28, (on the opposite side,) thence over a small idle sprocket 33, and around the sprocket 31. This arrangement of gearing provides for driving the sickle, the apron 24, and the reel, and it will be observed that as the traveler 17 and the frame 13 are run up and down they will always be in mesh or engagement with the chain 32 regardless of their height, and hence provision is made for driving them at all times.

Disposed in a general direction at right angles to the conveyer-apron 24 is an evener-apron 34, which runs over a roller 35 at its outer end and at its inner end over a roller 36, which is on the same shaft 37' as the sprocket 64. The evener-apron has the slats 38, which are provided with the teeth or fingers 39. This evener-apron is adapted to receive the cut corn from the conveyer-apron 24 and to deliver it after evening or straightening by reason of the engagement with the teeth 39 under a tapering roller 40, which is geared to the roller 36 by the intermeshing gears 41. Over the roller 40 and another similar roller, 40', runs an auxiliary evener feed-apron 40'', having the slats 38 and teeth 39, as on the evener-apron 34. This apron 40'' overlaps the evener-apron 34 somewhat and extends beyond the end of the latter and is so disposed above and in relation to the apron 34 that it acts on the corn and assists in spreading and evening the stalks, as well as feeding them from the evener-apron to the stop-gate 42.

Located a suitable distance in front of the rollers 36 and 40 is a stop-gate 42, consisting of a frame of depending fingers hinged or hung from a transverse rod 43. The ends or butts of the stalks project between the fingers of the gate, and the parallelism of the stalks is thus preserved, while they are stopped, and hence alined up the same length in convenient arrangement to be handled, by an operator standing on the front of the machine after the stop-gate 42 has been raised to permit their withdrawal prior to feeding by hand to the following mechanism.

Disposed in a general transverse direction to the length of the evener-apron and platform 44, on which the stalks are drawn by the operator, is a feed-chain 45. This feed-chain is endless and provided with teeth or fingers 46 and runs over suitable sprockets 47 and 48, the sprocket 48 being located to the left of the stop-gate 42 and the sprocket 47 at the extreme left side of the machine. Located adjacent the feed-chain 45 and the sprocket 48 is a pair of pressing-wheels 49, which press the heads of the stalks into the teeth 46 of the feed-chain as they are first fed thereto by the operator after removal from the stop-gate 42. After engagement with the feed-chain the stalks of broom-corn are drawn along on a platform or table 50 and their butts are all severed the same length by a rotary knife or cutter 51 on a shaft 52, suitably journaled to the frame 1.

At the rear of the feed-chain 45 is a boxing 53, in which are suitably journaled a pair of threshing-rolls 54, having spikes or teeth and disposed with their longitudinal axes at an inclination transversely to the length of the cornstalks, and as the cornstalks are drawn along by the feed-chain 45 the heads of the stalks pass in between the threshing-rollers 54, and these rollers thresh the heads. This threshing action is facilitated by the angular disposition of the threshing-rolls without hindering the action of the feed-chain or the progress of the broom-corn carried thereby. The harvesting action is then completed, and the stalks threshed and cut can be removed at the side of the machine. The threshing-rolls 54 are intergeared at 55 and operated by a belt 56 from a small engine 57, supported by the frame 1 between the traction-wheels 2.

A large sprocket 58 is secured to the hub of one of the traction-wheels and connected by sprocket-chain 59 to a sprocket 60, loose on a shaft 61. On the outer end of the shaft 61 is a sprocket 62, which is connected by a chain 63 to a sprocket 64 on the same shaft with sprocket 31. Provision is thus made for driving the sickle, the reel, the conveyer-apron, and the evener-apron and roll 40.

On the shaft 52 is a sprocket 65, which is connected by a chain 66 to a counter-shaft 67, which is connected by a chain 68 to a sprocket 69 on a shaft 70, extending lengthwise of the machine. On the shaft 70 is a bevel-pinion 71, meshing with a bevel-gear 72 on shaft 61. Provision is thus made for driving the rotary knife 51 by the movement of the machine.

The sprocket 47 is on the same shaft with a sprocket 73, over which runs a chain 74, whose lower portion runs over an idler 75, located near the bevel-gear 72, thence over sprocket 76 on shaft 70, thence over an idler-sprocket 77 and the upper portion of the chain 74, then passes under and is engaged by a sprocket 78, secured to and driven by counter-shaft 67. Slidable on a spline 61' on shaft 61 is a clutch member 80, adapted to engage a clutch member 81 on gear 60. The clutch member 80 is shifted by a lever 79 through the medium of a clutch-lever 82, pivoted on standard 83. Provision is thus made for clutching and unclutching the sprocket 60 to shaft 61 to throw the cutter or sickle in or out of operation, as desired.

In operation the machine is driven along, and while in movement the sickle mechanism can be raised or lowered and locked according to differences in the height of the corn to be harvested. The sickle severs the tops or upper parts of the standing broom-corn, and the reel gathers the corn into the sickle and afterward throws it onto the conveyer-apron 24, which carries it to the evener-apron 34. The fingers 39 of the slack 38 catch and hold the stalks in substantial parallelism, and the stalks then pass under the roller 40, which spreads and further arranges them, after which they are discharged in between the fingers of the gate 42 to be afterward brought forward onto the platform 44 by the pressure of feeding or by raising of the stop-gate by hand. The operator then feeds the stalks to the feed-chain 45, and the stalks are pressed into engagement with the teeth of the feed-chain by the wheels 49. The stalks pass along on the platform or table 50, and the heads are acted on while in transit by the threshing-rolls, and the butts are cut evenly by the rotary knife 51. The stalks after threshing are then removed from the machine.

I am aware that the essential principles of my invention could be carried out by the use of modified or different forms of construction than shown and described in this application, and I do not, therefore, limit myself to the present disclosures, but consider that I am entitled to all such modifications as fall within the spirit and scope of the invention.

Having thus described my invention, what I claim as new, and desire to secure by Letters Patent, is—

1. In a broom-corn harvester, the combination with the main frame, of an upright reel-post, a traveler adapted to move up and down on said reel-post, a reel carried by the traveler, harvesting or cutting mechanism, a slide movable on the reel-post and supporting the traveler from the harvesting or cutting mechanism, means for raising and lowering the harvesting or cutting mechanism and the reel-traveler together to different heights, and means for operating the reel and harvesting or cutting mechanism.

2. In a broom-corn harvester, the combination with harvesting or cutting mechanism, of rollers, a conveyer-apron operating over said rollers and adapted to receive the corn after cutting, a sprocket-wheel for operating one of the rollers, a sprocket-wheel having a connection with the cutting mechanism, a chain connecting said sprocket-wheels, bevel-gearing operating the sprocket-wheel first named, a sprocket-wheel connected to said bevel-gearing, relatively stationary sprocket-wheels, an endless sprocket-chain running over said sprocket-wheels and the sprocket-wheel of the bevel-gearing, a reel, a sprocket-wheel for operating the reel which has the chain running thereover, and means for operating the endless sprocket-chain whereby the cutting mechanism, reel and conveyer-apron are operated simultaneously.

3. In a broom-corn harvester, the combination with cutting or harvesting mechanism, of an apron arranged relatively to the cutting mechanism to receive the corn transversely of said apron after cutting, and a second apron running substantially at right angles to the conveyer-apron and having means thereon adapted to maintain the corn in substantial parallelism longitudinally of said second apron as placed thereon by the conveyer-apron.

4. In a broom-corn harvester, the combination with cutting or harvesting mechanism, of an apron arranged relatively to the cutting mechanism to receive the corn transversely of said apron after cutting, and a second apron running substantially at right angles to the conveyer-apron and provided with transverse slats having separated teeth which are adapted to maintain the corn in substantial parallelism longitudinally of said second apron as placed thereon by the conveyer-apron.

5. In a broom-corn harvester, the combination with cutting or harvesting mechanism, of an apron having means adapted to maintain the corn in substantial parallelism longitudinally of the apron, means for delivering the corn from the cutting mechanism to said apron longitudinally of said apron, and means located above the apron adapted to assist in maintaining the corn in substantial parallelism longitudinally of said apron.

6. In a broom-corn harvester, the combination with cutting or harvesting mechanism, of a main apron having means adapted to maintain the corn in substantial parallelism longitudinally of the apron, means for delivering the corn from the cutting mechanism to said apron longitudinally of said apron, and a supplemental apron located above the main apron and running in the same direction as said main apron, said supplemental apron coöperating with the main apron to assist in maintaining the corn in substantial parallelism on the main apron longitudinally thereof.

7. In a broom-corn harvester, the combination with an apron, and means on said apron for maintaining the corn thereon in substantial parallelism extending longitudinally of the apron, of a stop device independent of the apron, and means for feeding the corn from the apron to the stop device, said stop device arresting the corn.

8. In a broom-corn harvester, the combination with a main apron having means thereon adapted to maintain the corn in substantial parallelism longitudinally of the apron as placed on the apron, of a supplemental apron extending over the main apron and running in the same direction as the main apron and extending beyond the delivery end of said apron, and a stop device adapted to arrest the corn discharged from the apron, said supplemental apron being adapted to deliver the corn to the stop device.

9. In a broom-corn harvester, the combination with cutting or harvesting mechanism, of an apron having devices thereon for maintaining the corn in substantial parallelism lengthwise of said apron, means for delivering the corn from the cutting mechanism to said apron longitudinally of said apron, and a stop device for engaging the butts of the corn to arrest the discharge of the corn from the apron.

10. In a broom-corn harvester, the combination with an apron having devices thereon for maintaining the corn in substantial parallelism lengthwise of said apron, of harvesting or cutting mechanism, means for delivering the corn from the harvesting or cutting mechanism to said apron longitudinally of said apron, and a stop device to engage the butts of the corn as the corn discharges from the apron, said stop device having means to preserve the substantial parallelism of the corn after discharge from the apron.

11. In a broom-corn harvester, the combination with cutting or harvesting mechanism, of an apron having devices thereon for maintaining the corn in substantial parallelism lengthwise of said apron, means for delivering the corn from the cutting mechanism to said apron longitudinally of said apron, and a stop device having fingers and adapted to arrest the discharge of the corn from the apron, said fingers permitting the butts of the corn to project therebetween, thereby preserving the substantial parallelism of the corn.

12. In a broom-corn harvester, the combination with harvesting or cutting mechanism, of an apron having devices thereon for maintaining the corn in substantial parallelism lengthwise of said apron, means for delivering the corn from the cutting mechanism to said apron longitudinally of said apron, and a swinging gate adapted to arrest the discharge of the corn from the apron by engagement with the butts of the corn.

13. In a broom-corn harvester, the combination with harvesting or cutting mechanism, of an apron having devices thereon for maintaining the corn in substantial parallelism lengthwise of said apron, means for delivering the corn from the cutting mechanism to said apron longitudinally of said apron, a roller located adjacent the apron and adapted to assist in maintaining the corn on the apron by bearing on the corn, and a stop device adapted to arrest the discharge of the corn from the apron and roller.

14. In a broom-corn harvester, the combination with harvesting or cutting mechanism, of an apron having devices thereon for maintaining the corn in substantial parallelism lengthwise of said apron, means for delivering the corn from the cutting mechanism to said apron longitudinally of said apron, a roller disposed adjacent the discharge portion of the apron and adapted to assist in maintaining the corn on the apron by bearing on the corn, and a stop device located beyond the roller and adapted to arrest the discharge of the corn from the apron and roller.

15. In a broom-corn harvester, the combination with threshing mechanism, of a feed device for conducting the heads of the corn through the threshing mechanism, a table or platform on which the butts of the corn travel while going through the threshing mechanism, and means for severing the butts while passing over the table and while the heads are being threshed.

In testimony whereof I affix my signature in presence of two witnesses.

FRANK SUTTON.

Witnesses:
FRANK P. COPPAGE,
BEN. C. CHAPMAN.